US007357755B2

(12) United States Patent
Fukushima et al.

(10) Patent No.: US 7,357,755 B2
(45) Date of Patent: Apr. 15, 2008

(54) ENGINE SPEED CONTROL SYSTEM FOR WALK-BEHIND TRUCK

(75) Inventors: Tomoki Fukushima, Wako (JP); Hayato Matsuda, Wako (JP); Shinichi Katsuragawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 11/234,149

(22) Filed: Sep. 26, 2005

(65) Prior Publication Data

US 2006/0068977 A1 Mar. 30, 2006

(30) Foreign Application Priority Data

Sep. 29, 2004 (JP) ............................ 2004-285070

(51) Int. Cl.
*B60W 10/02* (2006.01)
*B60W 10/06* (2006.01)
*B60W 10/20* (2006.01)

(52) U.S. Cl. ...................................... 477/181; 477/903

(58) Field of Classification Search .................... 477/1, 477/181, 903
See application file for complete search history.

(56) References Cited

U.S. PATENT DOCUMENTS 5,092,435 A * 3/1992 Sone et al. ................. 477/169
6,553,303 B2 * 4/2003 Matsuno ...................... 701/67
6,564,481 B2 * 5/2003 Wakitani et al. .............. 37/348
7,073,613 B2 * 7/2006 Wakitani et al. ............. 180/6.5
2002/0107106 A1 * 8/2002 Kato et al. .................. 477/110

FOREIGN PATENT DOCUMENTS

JP 2002-312551 11/2003

* cited by examiner

*Primary Examiner*—Sherry Estremsky
*Assistant Examiner*—Edwin A Young
(74) *Attorney, Agent, or Firm*—Westerman, Hattori, Daniels & Adrian, LLP.

(57) ABSTRACT

In an engine speed control system mounted on a walk-behind truck having a bed that carries cargo, to power driven wheels through a clutch such that the truck runs and the engine speed is controlled to a desired engine speed, it is detected whether the operator performs operation for disengaging the clutch or for turning the truck, and the desired engine speed is determined to a first value when the operator does not perform any of the operations, while determining it to a second value (lower than the first value) when the operator performs the clutch disengaging or truck turning operation, thereby preventing lurching and sharp turning, protecting cargo against being damaged and falling off, and minimizing fuel consumption and noise.

6 Claims, 7 Drawing Sheets

ENGINE SPEED CONTROL SYSTEM FOR WALK-BEHIND TRUCK

BACKGROUND OF THE INVENTION

1. Field of the Invention

This invention relates to an engine speed control system for a walk-behind truck.

2. Description of the Related Art

Common use is made of walk-behind trucks that are equipped with a bed for loading cargo and driven by the rotation of an engine transmitted to drive wheels, as taught by, for example, Japanese Laid-Open Patent Application No. 2003-312551. This type of truck is usually equipped with a clutch for transmitting the engine output to the driven wheels and the operator sets the truck in motion by engaging the clutch. Availability of sufficient power for driving the truck is ensured by using a mechanical governor or the like to maintain the engine speed in a high speed region for producing a high output. The truck taught by this reference is of the walk-behind type, i.e., of the type the operator walks behind while operating.

The engine of the conventional walk-behind truck is constantly operated at high speed. The stopped truck may therefore lurch (jackrabbit) when the clutch is engaged and cargo may be damaged or fall off as a result. Such a walk-behind truck is usually turned by discontinuing the supply of power to the driven wheel on one side to produce a difference in the rate of rotation between the left and right driven wheels. The walk-behind truck may therefore turn sharply when the power supply to one driven wheel is stopped with the speed of the engine maintained at a high level. This also may result in cargo being damaged or falling off. Constant operation of the engine in the high-speed range also increases fuel consumption and noise.

SUMMARY OF THE INVENTION

An object of this invention is therefore to overcome the foregoing drawbacks by providing an engine speed control system for a walk-behind truck that prevents lurching and sharp turning, thereby protecting cargo against being damaged and falling off, and that minimizes fuel consumption and noise.

In order to achieve the object, this invention provides in a first aspect a system for controlling a speed of an internal combustion engine mounted on a walk-behind truck having a bed that carries cargo, to power driven wheels through a clutch such that the truck runs, comprising: an engine speed controller controlling the speed of the engine to a desired engine speed; a clutch-disengaged switch generating a first output indicating that an operator performs an operation for disengaging the clutch; a turn-lever switch generating a second output indicating that the operator performs an operation for turning the truck; and a desired engine speed determiner determining the desired engine speed to a first value when the first output and the second output are not generated, while determining the desired engine speed to a second value, that is lower than the first value, when at least one of the first output and the second output is generated.

In order to achieve the object, this invention provides in a second aspect a method of controlling a speed of an internal combustion engine mounted on a walk-behind truck having a bed that carries cargo to power driven wheels through a clutch such that the truck runs, comprising the steps of: controlling the speed of the engine to a desired engine speed; detecting whether an operator performs a first operation for disengaging the clutch; detecting whether the operator performs a second operation for turning the truck; and determining the desired engine speed to a first value when the first operation and the second operation are not detected, while determining the desired engine speed to a second value, that is lower than the first value, when at least one of the first operation and the second operation is detected.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of an engine speed control system for a walk-behind truck according to an embodiment of the present invention will now be explained with reference to the attached drawings.

Figure 1:
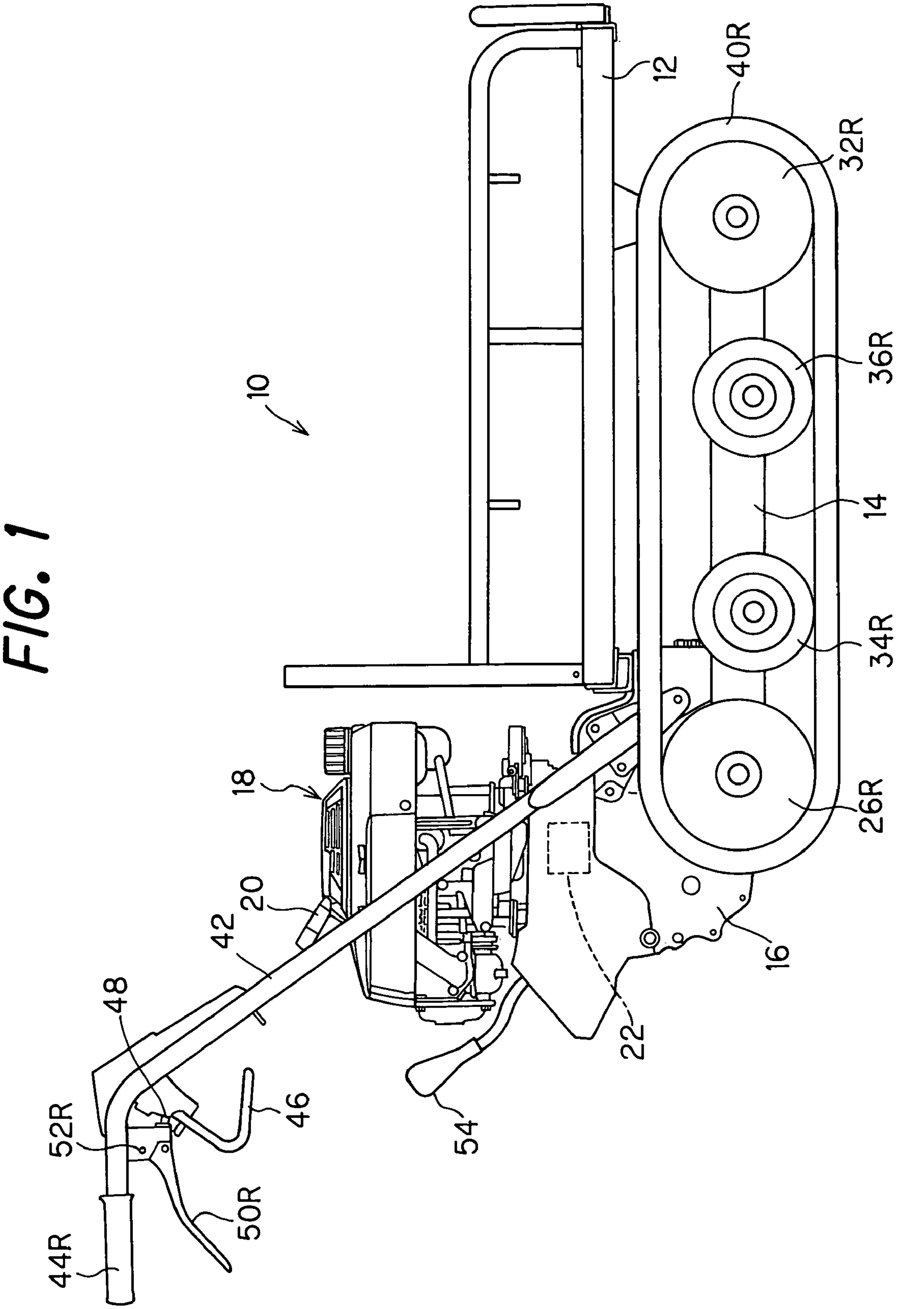
FIG. 1 is a side view of a walk-behind truck to which an engine speed control system according to an embodiment of this invention is applied.
Figure 2:
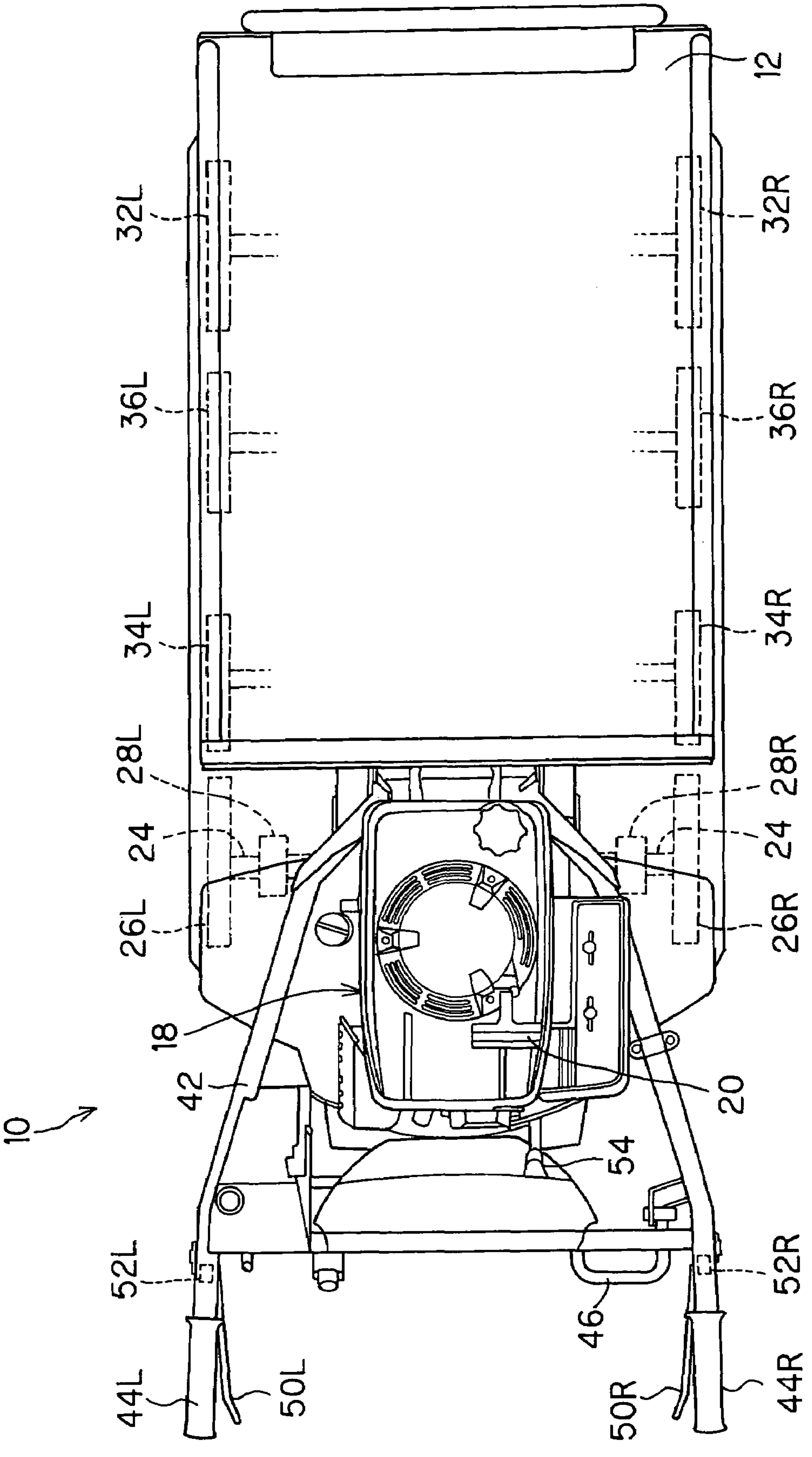
FIG. 2 is a plan view of the walk-behind truck shown in FIG. 1.

FIG. 1 is a side view of the walk-behind truck to which an engine speed control system according to an embodiment of this invention is applied. FIG. 2 is a plan view of the walk-behind truck shown in FIG. 1.

The walk-behind truck is designated by the symbol 10 in FIGS. 1 and 2.

The walk-behind truck 10 has a bed 12 that carries cargo (not shown). The bed 12 is mounted on a front section of a frame 14 of the walk-behind truck 10. A transmission 16 is mounted on a rear section of the frame 14. The transmission 16 has two forward speeds and one reverse speed gears. An internal combustion engine 18 is mounted above the transmission 16. The operator starts the engine 18 using its recoil starter 20.

The crankshaft (not shown in FIGS. 1 and 2) of the engine 18 is connected to the input shaft (not shown) of the transmission 16 through a drive clutch (main clutch) 22. The output shaft (not shown) of the transmission 16 is connected to left and right driven wheels 26L, 26R through a driveshaft 24 rotatably supported by the frame 14. The driveshaft 24 is made up of segments interconnected through left and right side clutches 28L, 28R. The output of the engine 18 is thus transmitted to the driven wheels 26L, 26R through the drive clutch 22, transmission 16, driveshaft 24 and side clutches 28L, 28R.

Left and right free (non-driven) wheels 32L, 32R are mounted on the frame 14 forward of the driven wheels 26L, 26R. Pairs of left and right track wheels 34L, 36L and 34R, 36R are mounted on the frame 14 between the driven wheels 26L, 26R and free wheels 32L, 32R, respectively.

As shown in FIG. 1, a crawler belt 40R encircles the driven wheel 26R, free wheel 32R and track wheels 34R, 36R on the right side. Although not shown in FIG. 1, a crawler belt similarly encircles the driven wheel 26L, free wheel 32L and track wheels 34L, 36L on the left side. The walk-behind truck 10 can therefore be driven by transmitting the output of the engine 18 to the driven wheels 26L, 26R to rotate the left and right crawler belts.

As shown in FIGS. 1 and 2, handlebars 42 are mounted at the rear of the frame 14. The handlebars 42 extend upward and rearward from the back of the walk-behind truck 10 and is formed at the upper end with left and right handgrips 44L, 44R to be gripped by the operator.

A drive clutch lever 46 is installed on the handlebars 42 to be manipulated by the operator. The drive clutch lever 46 is connected to the drive clutch 22 through a cable (not shown). The operator can therefore engage and disengage the drive clutch 22 by manipulating the drive clutch lever 46. A clutch-disengaged switch 48 (shown in FIG. 1) is installed on the handlebars 42 near the drive clutch lever 46. The clutch-disengaged switch 48 generates an ON signal or output upon detecting that the drive clutch lever 46 has been manipulated in the direction of disengaging the drive clutch 22. In other words, when the operator manipulates to disengage the drive clutch 22, the clutch-disengaged switch 48 detects this operation.

Left and right turn levers 50L, 50R are also installed on the handlebars 42 to be manipulated by the operator. The left turn lever 50L is connected to the left side clutch 28L through a cable (not shown). The operator can therefore disengage the left side clutch 28L by operating the left turn lever 50L. The right turn lever 50R is connected to the right side clutch 28R through a cable (not shown). The operator can therefore disengage the right side clutch 28R by operating the right turn lever 50R.

When one or the other of the left and right side clutches 28L, 28R is disengaged, a difference in the rate of rotation occurs between the left and right driven wheels 26L, 26R. The walk-behind truck 10 therefore turns. Manipulation of the left lever 50L to disengage the left side clutch 28L makes the walk-behind truck 10 turn left. Manipulation of the right lever 50R to disengage the right side clutch 28R makes the walk-behind truck 10 turn right.

Turn-lever switches 52L, 52R are installed near the turn levers 50L, 50R, respectively. The left turn-lever switch 52L generates an ON signal or output upon detecting that the left turn lever 50L has been manipulated. The right turn-lever switch 52R generates an ON signal or output upon detecting that the right turn lever 50R has been manipulated. In other words, the left and right turn-lever switches 52L, 52R detect that the operator has performed an operation for turning the walk-behind truck 10.

A drive lever 54 is installed near the transmission 16. The drive lever 54 is a shift lever for shifting gears of the transmission 16. The operator can use the drive lever 54 to select the gear position of the transmission 16 from among two forward gears and one reverse gear or to put the transmission 16 in a neutral position.

Figure 3:
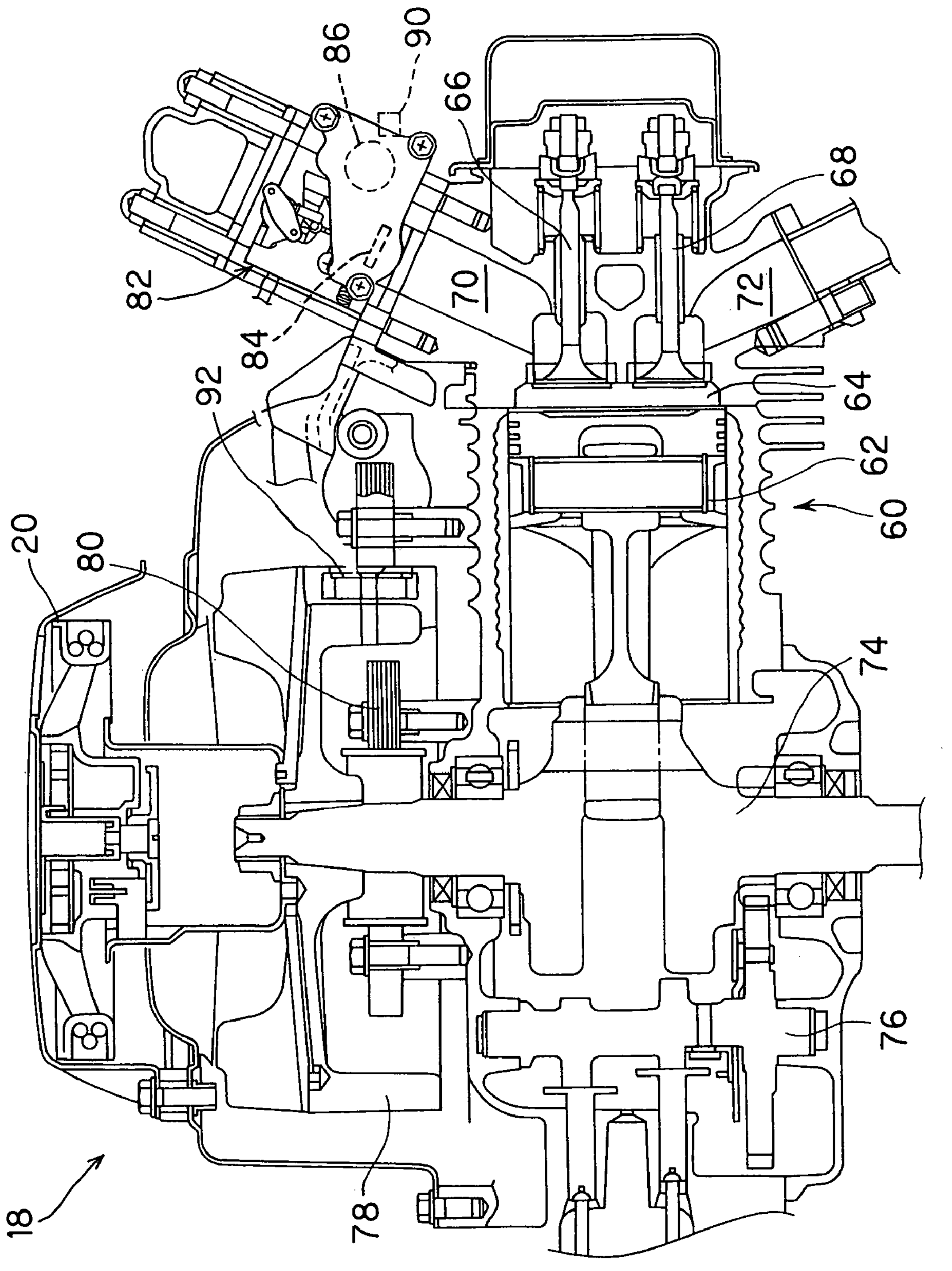
FIG. 3 is an explanatory sectional view of an engine shown in FIG. 1.

FIG. 3 is an explanatory sectional view of the engine 18.

The engine 18 has a single cylinder 60 accommodating a piston 62 that reciprocates therein. A combustion chamber 64 of the engine 18 is provided with an intake valve 66 and an exhaust valve 68 for opening and closing communication of the combustion chamber 64 with an intake pipe 70 and an exhaust pipe 72. The engine 18 is an air-cooled, four-stroke, one-cylinder, OHV internal combustion engine with a displacement of 118 cc.

The piston 62 is connected to a crankshaft 74 that is connected to a camshaft 76 through a gear. A flywheel 78 is attached near one end of the crankshaft 74. The recoil starter 20 mentioned above is attached to the crankshaft 74 toward its distal end from the flywheel 78. Although not illustrated, the other end of the crankshaft 74 is connected through the drive clutch 22 to the input shaft of the transmission 16.

A magneto coil (alternator) 80 is installed inward of the flywheel 78 for generating alternating current. The alternating current generated by the magneto coil 80 is converted to direct current by a processing circuit (not shown) and supplied as operating power to an ECU (discussed below), an ignition circuit (not shown) and so forth.

A throttle body 82 is installed at the upstream end of the intake pipe 70. The throttle body 82 accommodates a throttle valve 84 that is connected through a throttle shaft and reduction gearing (neither shown) to an electric motor (stepping motor serving as an actuator) 86. A carburetor assembly (not shown) is provided in the throttle body 82 on the upstream side of the throttle valve 84. The carburetor assembly is connected to a fuel tank (not shown) and produces an air-fuel mixture by injecting gasoline fuel into air drawn in at a rate determined by the opening of the throttle valve 84. The produced air-fuel mixture is drawn into the combustion chamber 64 of the cylinder 60 through the throttle valve 84, intake pipe 70 and intake valve 66.

A throttle position sensor 90 installed near the motor 86 generates a signal or output corresponding to the opening θTH of the throttle valve 84 (hereinafter sometimes called the "throttle opening"). A crank angle sensor 92 constituted as a magnetic pickup is installed near the flywheel 78 to generate an output in pulse signal once every prescribed crank angle.

Figure 4:
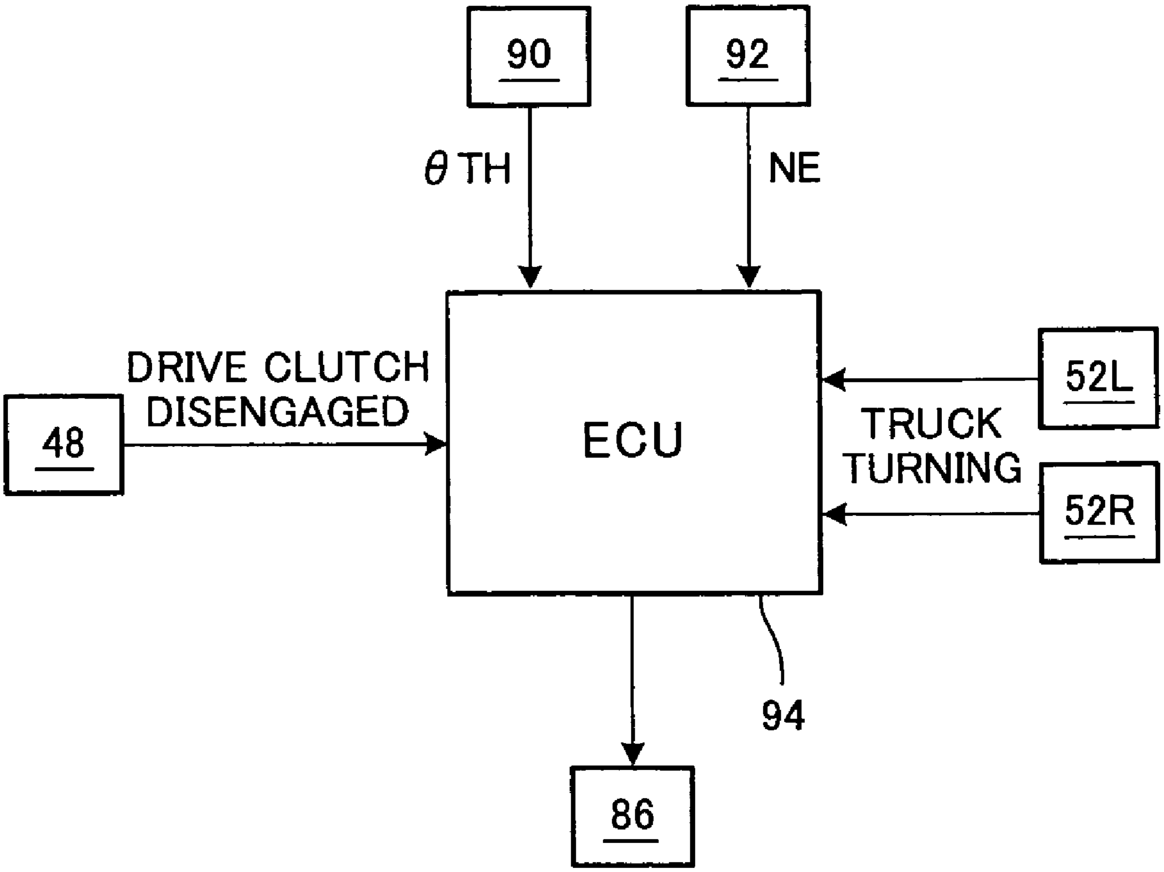
FIG. 4 is a block diagram schematically illustrating the operation of the engine speed control system for the walk-behind truck shown in FIG. 1.

FIG. 4 is a block diagram schematically illustrating the operation of the engine speed control system for the walk-behind truck 10.

As shown in FIG. 4, the outputs of the throttle position sensor 90 and crank angle sensor 92 are forwarded to an ECU (electronic control unit) 94. The ECU 94 comprises a microcomputer equipped with a CPU, ROM, RAM and a counter. It is installed an appropriate location of the walk-behind truck 10.

The ECU 94 counts the output pulses of the crank angle sensor 92 and calculates or detects the engine speed NE. Based on the detected engine speed NE and throttle opening θTH, the ECU 94 calculates a current command value for the motor 86 so as to make the engine speed NE equal to a desired engine speed NED and outputs the calculated current command value, via a driver circuit (not shown), to the motor 86 to control the operation thereof.

The motor 86, the ECU 94, the sensors and the like thus constitute an electronic throttle system (electronic governor) that controls the opening of the throttle valve 84 so as to control the engine speed NE of the engine 18 to the desired engine speed NED.

The ECU 94 is also inputted with the signal or output generated by the clutch-disengaged switch 48 (i.e., the ON signal outputted when the operator disengages the drive clutch 22) and the signal or outputs generated by the left and right turn-lever switches 52L, 52R (i.e., the ON signals outputted when the operator operates the walk-behind truck 10 to turn left and right). The ECU 94 determines or sets the desired engine speed NED based on these inputted signals.

Figure 5:
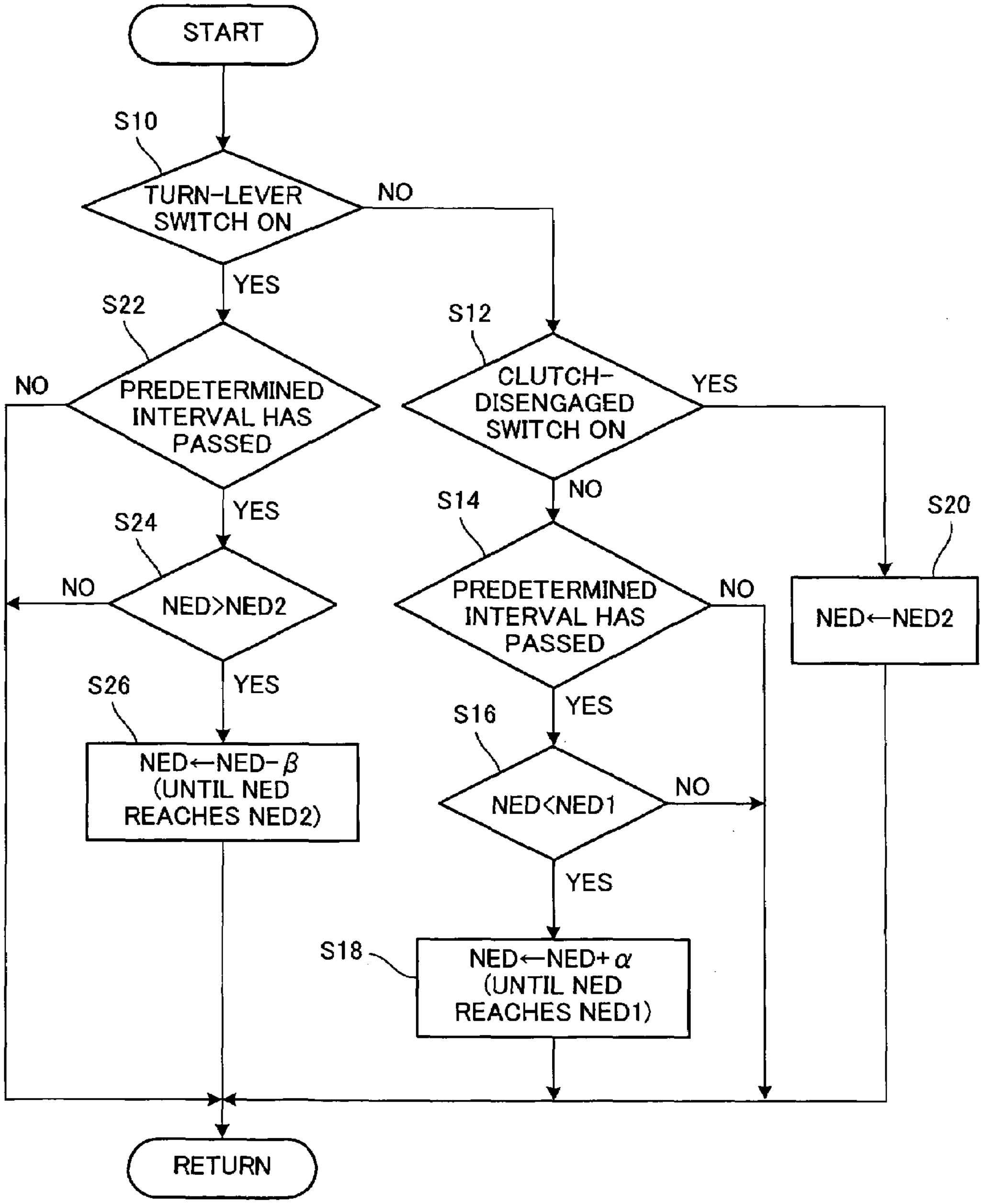
FIG. 5 is a flowchart showing a routine for carrying out the process in the operation of the engine speed control system for the walk-behind truck shown in FIG. 1.

The process for setting the desired engine speed NED, which is one aspect of the operation of the engine speed control system for the walk-behind truck 10 according to this embodiment, will now be explained with reference to FIGS. 5 to 7. FIG. 5 is a flowchart showing a routine for carrying out the process. The ECU 94 executes the routine at prescribed intervals (of, for example, 20 msec).

First, in S10, it is determined whether at least one of the left and right turn-lever switches 52L, 52R generates an ON signal or output, i.e., whether the operator has carried out an operation for turning the walk-behind truck 10. When the result in S10 is NO, the routine goes to S12, in which it is determined whether the clutch-disengaged switch 48 generates an ON signal or output, i.e., whether the operator disengaged the drive clutch 22 (whether the truck 10 is stopped).

When the result in S12 is NO, i.e., when the walk-behind truck 10 is moving and the walk-behind truck 10 moves straight (the result in S10 is NO), the routine goes to S14, in which it is determined whether a predetermined interval (time period) has passed. The predetermined interval, which is that from the time point at which the desired engine speed NED was last changed, is set to 100 msec in this embodiment. When the result in S14 is NO, the remaining steps of the routine are skipped, and when it is YES, the routine goes to S16, in which it is determined whether the desired engine speed NED is smaller than a first desired engine speed (first value) NED1. In this embodiment, the operator uses a speed command input means (not shown) to set or determine the first desired engine speed NED1 to a desired value higher than the idle speed, which is 2,000 rpm in this embodiment. The first desired engine speed NED1 is ordinarily set or determined in a high-speed range (e.g., 3,500 rpm) in which the output of the engine 18 is high.

When the result in S16 is NO, the remaining step of the routine is skipped, and when it is YES, the routine goes to S18, in which the value obtained by adding a first predetermined (speed) value (first amount) a to the present or current desired engine speed NED is defined as a new desired engine speed NED. In this embodiment, the first predetermined value a is 100 rpm. When the new desired engine speed NED set in S18 exceeds the first desired engine speed NED1, the desired engine speed NED is made equal to the first desired engine speed NED1. In other words, the upper limit of the desired engine speed NED is the first desired engine speed NED1.

Therefore, when the operator performs neither an operation for turning the walk-behind truck 10 nor an operation for disengaging the drive clutch 22, the desired engine speed NED is raised successively toward the first desired engine speed NED1 at the rate of 100 rpm per 100 msec.

When the result in S12 is YES, i.e., when it is found that the walk-behind truck 10 is stopped, the routine goes to S20, in which the desired engine speed NED is set or determined to a second desired engine speed (second value) NED2. The second desired engine speed NED2 is set to a value lower than the first desired engine speed NED1, specifically to the idle speed. Thus when the operator disengages the drive clutch 22, the desired engine speed NED is immediately or instantaneously lowered to the second desired engine speed NED2 (that is lower than the first desired engine speed NED1).

When the result in S10 is YES, the routine goes to S22, in which it is determined whether the predetermined interval (time period) has passed, i.e., whether 100 msec has passed since the desired engine speed NED was last changed. When the result in S22 is NO, the remaining steps of the routine are skipped, and when it is YES, the routine goes to S24, in which it is determined whether the desired engine speed NED exceeds the second desired engine speed NED2.

When the result in S24 is NO, the remaining step of the routine is skipped, and when it is YES, the routine goes to S26, in which the value obtained by subtracting a second predetermined (speed) value (second amount) β from the present or current desired engine speed NED is defined as a new desired engine speed NED. The second prescribed value β is set or determined to a larger value than the first predetermined value α, namely to 500 rpm in this embodiment. When the new desired engine speed NED set in S26 is smaller than the second desired engine speed NED2, the desired engine speed NED is made equal to the second desired engine speed NED2. In other words, the lower limit of the desired engine speed NED is the second desired engine speed NED2.

Thus when the operator performs an operation for turning the walk-behind truck 10, the desired engine speed NED is lowered successively toward the second desired engine speed NED2 at the rate of 500 rpm per 100 msec.

The foregoing process will be explained again with reference to FIGS. 6 and 7. FIGS. 6 and 7 are time charts showing the desired engine speed NED change relative to the outputs of the clutch-disengaged switch 48 and the left and right turn-lever switches 52L, 52R. In these drawings, the outputs of the left and right turn-lever switches 52L, 52R are indicated by OFF when both output OFF signals and as ON when at least one of them outputs an ON signal.

Figure 6:
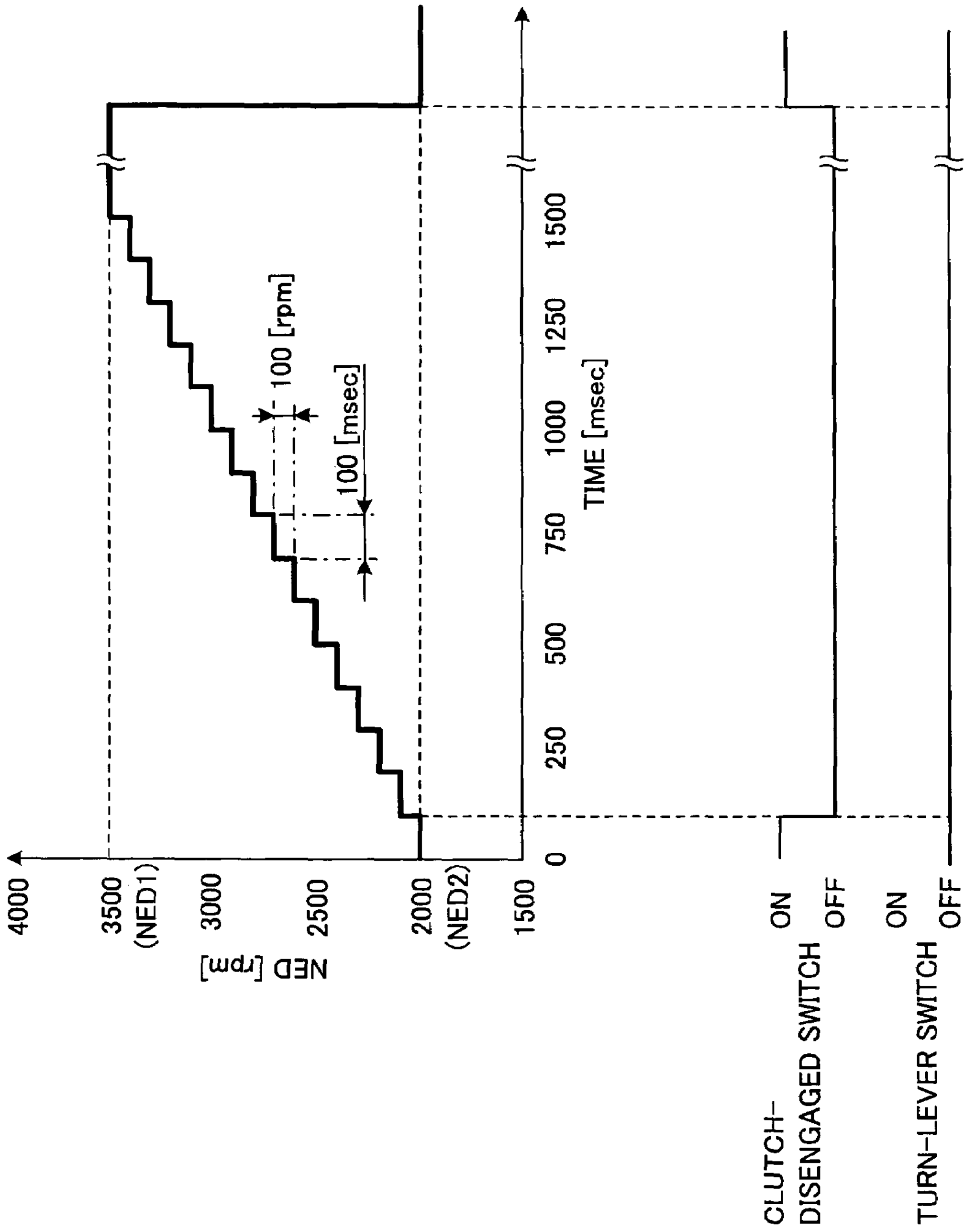
FIG. 6 is a time chart showing a desired engine speed change relative to outputs of a clutch-disengaged switch and turn-lever switches illustrated in FIG. 1.

As shown in FIG. 6, when the clutch-disengaged switch 48 and turn-lever switches 52L, 52R all output OFF signals, i.e., when the walk-behind truck 10 is moving along a straight line (when the result in S12 of the flowchart of FIG. 5 is NO), the desired engine speed NED is raised gradually toward the first desired engine speed NED1 at the rate of 100 rpm per 100 msec to be finally set at the first desired engine speed NED1.

When the clutch-disengaged switch 48 outputs an ON signal, i.e., when the walk-behind truck 10 is stopped (when the result in S12 of the flowchart of FIG. 5 is YES), the desired engine speed NED is immediately (instantaneously) lowered to the second desired engine speed NED2 to be set at the second desired engine speed NED2.

Figure 7:
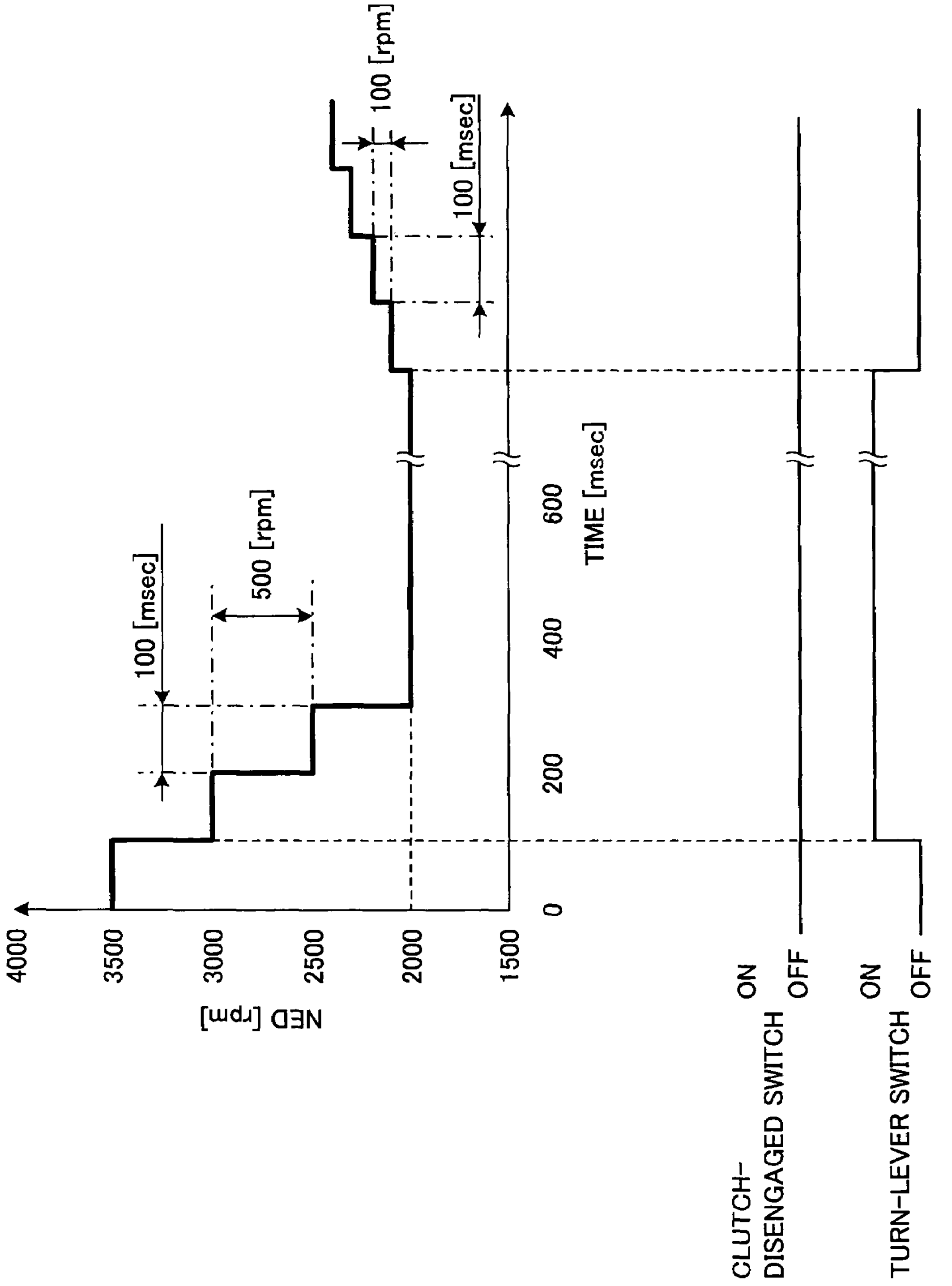
FIG. 7 is a time chart similarly showing the desired engine speed change relative to the outputs of the clutch-disengaged switch and turn-lever switches illustrated in FIG. 1.

As shown in FIG. 7, when a turn-lever switch outputs an ON signal, i.e., when the walk-behind truck 10 is turning (when the result in S10 of the flow chart of FIG. 5 is YES), the desired engine speed NED is lowered toward the second desired engine speed NED2 at the rate of 500 rpm per 100 msec (i.e., at a higher rate of change than when the desired engine speed NED is raised) to be set at the second desired engine speed NED2. The reason for lowering the desired engine speed NED successively or stepwise when the walk-behind truck 10 is turning (i.e., more gradually than when the walk-behind truck 10 is stopped) is that the operator would be given an unnatural impression if the walk-behind truck 10 should be made to decelerate rapidly by lowering the desired engine speed NED from the first desired engine speed NED1 to the second desired engine speed NED2 all at once.

As shown in FIG. 7, when the walk-behind truck 10 resumes straight travel after completing a turn, the desired engine speed NED is gradually raised from the second desired engine speed NED2 toward the first desired engine speed NED1.

As explained in the foregoing, the engine speed control system of the walk-behind truck 10 of this embodiment is equipped with the clutch-disengaged switch 48 for detecting that the operator has disengaged the drive clutch 22 and the turn-lever switches 52L, 52R for detecting that the operator has performed an operation for turning the walk-behind truck 10. When neither an operation for disengaging the drive clutch 22 nor an operation for turning the walk-behind truck 10 is detected, the desired engine speed NED is set to the first desired engine speed NED1, and when either an operation for disengaging the drive clutch 22 or an operation for turning the walk-behind truck 10 is detected, the desired engine speed NED is set to the second desired engine speed NED2 (that is lower than the first desired engine speed NED1). In other words, the engine speed NE is lowered when the walk-behind truck 10 is stopped or in the course of turning. Lurching and sharp turning of the walk-behind truck 10 can therefore be prevented to protect cargo against being damaged and falling off. In addition, fuel consumption and noise are reduced in comparison with the conventional walk-behind truck that constantly maintains the engine speed NE in a high-speed range.

When at least one of an operation for disengaging the drive clutch 22 and an operation for turning the walk-behind truck 10 is detected, the desired engine speed NED is immediately lowered from the first desired engine speed NED1 toward the second desired engine speed NED2. Fuel consumption and noise are therefore still more effectively reduced. Then, when there is once again no detection of either an operation for disengaging the drive clutch 22 or an operation for turning the walk-behind truck 10, the desired engine speed NED is gradually raised from the second desired engine speed NED2 back toward the first desired engine speed NED1. In this case, too, lurching can be prevented to protect cargo against being damaged and falling off.

The embodiment is thus configured to have a system for controlling a speed of an internal combustion engine (18) mounted on a walk-behind truck (10) having a bed (12) that carries cargo, to power driven wheels through a clutch (drive clutch 22) such that the truck runs, comprising: an engine speed controller (ECU 94) controlling the speed of the engine (NE) to a desired engine speed (NED); a clutch-disengaged switch (clutch-disengaged switch 48) generating a first output indicating that an operator performs an operation for disengaging the clutch; a turn-lever switch (turn-lever switch 52) generating a second output indicating that the operator performs an operation for turning the truck; and a desired engine speed determiner (ECU 94, S10 to S26) determining the desired engine speed (NED) to a first value (first desired engine speed NED1) when the first output and the second output are not generated, while determining the desired engine speed to a second value (second desired engine speed NED2), that is lower than the first value, when at least one of the first output and the second output is generated.

In the system, the desired engine speed determiner raises the desired engine speed (NED) toward the first value if the desired engine speed (NED) is smaller than the first value (NED1) when the first output and the second output are not generated (S10 to S20).

In the system, the desired engine speed determiner raises the desired engine speed (NED) toward the first value (NED1) successively by a first predetermined amount (first predetermined value α) (S18).

In the system, the desired engine speed determiner raises the desired engine speed (NED) toward the first value when a predetermined time period has passed (S14 to S18).

In the system, the desired engine speed determiner lowers the desired engine speed (NED) toward the second value (second desired engine speed NED2) if the desired engine speed (NED) exceeds the second value when at least one of the first output and the second output is generated (S10 to S18).

In the system, the desired engine speed determiner lowers the desired engine speed (NED) toward the second value (NED2) successively by a second predetermined amount (second predetermined value β) that is set to be larger than the first amount (S10, S22 to S28).

In the system, the desired engine speed determiner lowers the desired engine speed (NED) toward the second value (NED2) when a predetermined time period has passed (S22 to S26).

In the system, the second value (NED2) is set to an idle speed.

It should be noted that, the values of the first desired engine speed NED1, second desired engine speed NED2, predetermined interval, first predetermined value α and second predetermined value β are not limited to those specified in the foregoing explanation.

It should also be noted that, although the foregoing embodiment uses a stepping motor as the actuator for opening and closing the throttle valve 84, a DC motor, rotary solenoid or any of various other actuators may be used instead.

Japanese Patent Application No. 2004-285070 filed on Sep. 29, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a speed of an internal combustion engine mounted on a walk-behind truck having a bed that carries cargo, to power driven wheels through a clutch such that the truck runs, comprising:

an engine speed controller controlling the speed of the engine to a desired engine speed; a clutch-disengaged switch generating a first output indicating that an operator performs an operation for disengaging the clutch;

a turn-lever switch generating a second output indicating that the operator performs an operation for turning the truck; and a desired engine speed determiner determining the desired engine speed to a first value when the first output and the second output are not generated, while determining the desired engine speed to a second value, that is lower than the first value, when at least one of the first output and the second output is generated, wherein the desired engine speed determiner raises the desired engine speed toward the first value if the desired engine speed is smaller than the first value when the first output and the second output are not generated, and wherein the desired engine speed determiner raises the desired engine speed toward the first value when a predetermined time period has passed.

2. A system for controlling a speed of an internal combustion engine mounted on a walk-behind truck having a bed that carries cargo, to power driven wheels through a clutch such that the truck runs, comprising:

an engine speed controller controlling the speed of the engine to a desired engine speed; a clutch-disengaged switch generating a first output indicating that an operator performs an operation for disengaging the clutch;

a turn-lever switch generating a second output indicating that the operator performs an operation for turning the truck; and a desired engine speed determiner determining the desired engine speed to a first value when the first output and the second output are not generated, while determining the desired engine speed to a second value, that is lower than the first value, when at least one of the first output and the second output is generated, wherein the desired engine speed determiner lowers the desired engine speed toward the second value if the desired engine speed exceeds the second value when at least one of the first output and the second output is generated, and wherein the desired engine speed determiner lowers the desired engine speed toward the second value successively by a second predetermined amount that is set to be larger than a first predetermined amount that corresponds to an amount by which the desired engine speed determiner raises the desired engine speed towards the first value.

3. A system for controlling a speed of an internal combustion engine mounted on a walk-behind truck having a bed that carries cargo, to power driven wheels through a clutch such that the truck runs, comprising:

an engine speed controller controlling the speed of the engine to a desired engine speed; a clutch-disengaged switch generating a first output indicating that an operator performs an operation for disengaging the clutch;

a turn-lever switch generating a second output indicating that the operator performs an operation for turning the truck, and a desired engine speed determiner determining the desired engine speed to a first value when the first output and the second output are not generated, while determining the desired engine speed to a second value, that is lower than the first value, when at least one of the first output and the second output is generated, wherein the desired engine speed determiner lowers the desired engine speed toward the second value if the desired engine speed exceeds the second value when at least one of the first output and the second output is generated, and wherein the desired engine speed determiner lowers the desired engine speed toward the second value when a predetermined time period has passed.

4. A method of controlling a speed of an internal combustion engine mounted on a walk-behind truck having a bed that carries cargo to power driven wheels through a clutch such that the truck runs, comprising the steps of:

controlling the speed of the engine to a desired engine speed;

detecting whether an operator performs a first operation for disengaging the clutch;

detecting whether the operator performs a second operation for turning the truck; and determining the desired engine speed to a first value when the first operation and the second operation are not detected, while determining the desired engine speed to a second value, that is lower than the first value, when at least one of the first operation and the second operation is detected, wherein the step of desired engine speed determining raises the desired engine speed toward the first value when a predetermined time period has passed.

5. A method of controlling a speed of an internal combustion engine mounted on a walk-behind truck having a bed that carries cargo to power driven wheels through a clutch such that the truck runs, comprising the steps of:

controlling the speed of the engine to a desired engine speed;

detecting whether an operator performs a first operation for disengaging the clutch; detecting whether the operator performs a second operation for turning the truck; and determining the desired engine speed to a first value when the first operation and the second operation are not detected, while determining the desired engine speed to a second value, that is lower than the first value, when at least one of the first operation and the second operation is detected, wherein the step of desired engine speed determining lowers the desired engine speed toward the second value if the desired engine speed exceeds the second value when at least one of the first operation and the second operation is detected, and wherein the step of desired engine speed determining lowers the desired engine speed toward the second value successively by a second predetermined amount that is set to be larger than a first predetermined amount that corresponds to an amount by which the desired engine speed determiner raises the desired engine speed towards the first value.

6. A method of controlling a speed of an internal combustion engine mounted on a walk-behind truck having a bed that carries cargo to power driven wheels through a clutch such that the truck runs, comprising the steps of:

controlling the speed of the engine to a desired engine speed;

detecting whether an operator performs a first operation for disengaging the clutch;

detecting whether the operator performs a second operation for turning the truck; and determining the desired engine speed to a first value when the first operation and the second operation are not detected, while determining the desired engine speed to a second value, that is lower than the first value, when at least one of the first operation and the second operation is detected, wherein the step of desired engine speed determining lowers the desired engine speed toward the second value if the desired engine speed exceeds the second value when at least one of the first operation and the second operation is detected, and wherein the step of desired engine speed controlling lowers the engine speed toward the second value when a predetermined lime period has passed.

* * * * *